Nov. 15, 1955 R. T. FLORA 2,723,609
CAMERA APPARATUS FOR TAKING THREE-DIMENSIONAL STILL PICTURES
Filed Feb. 15, 1954 4 Sheets-Sheet 2
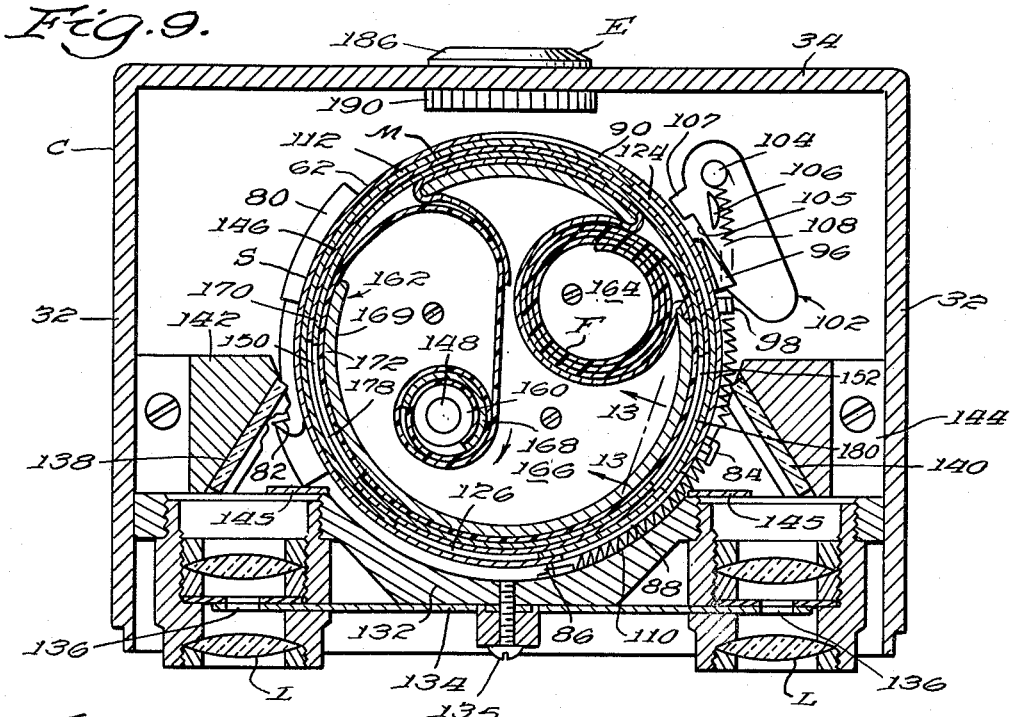
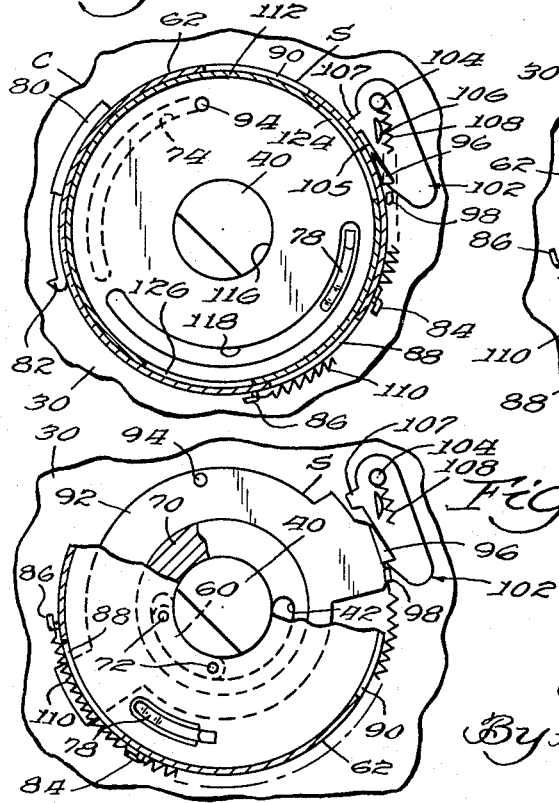
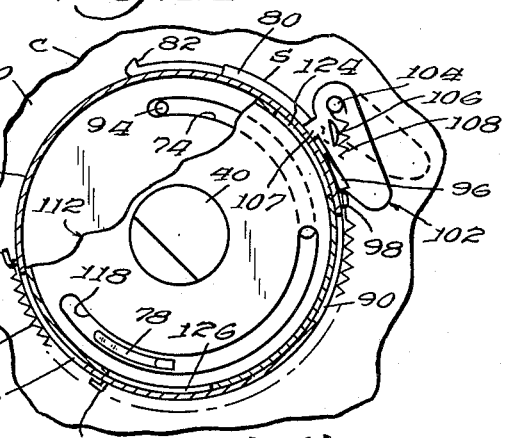
Inventor:
Rolla T. Flora.
By Fulwider, Mattingly & Babcock
Attys.

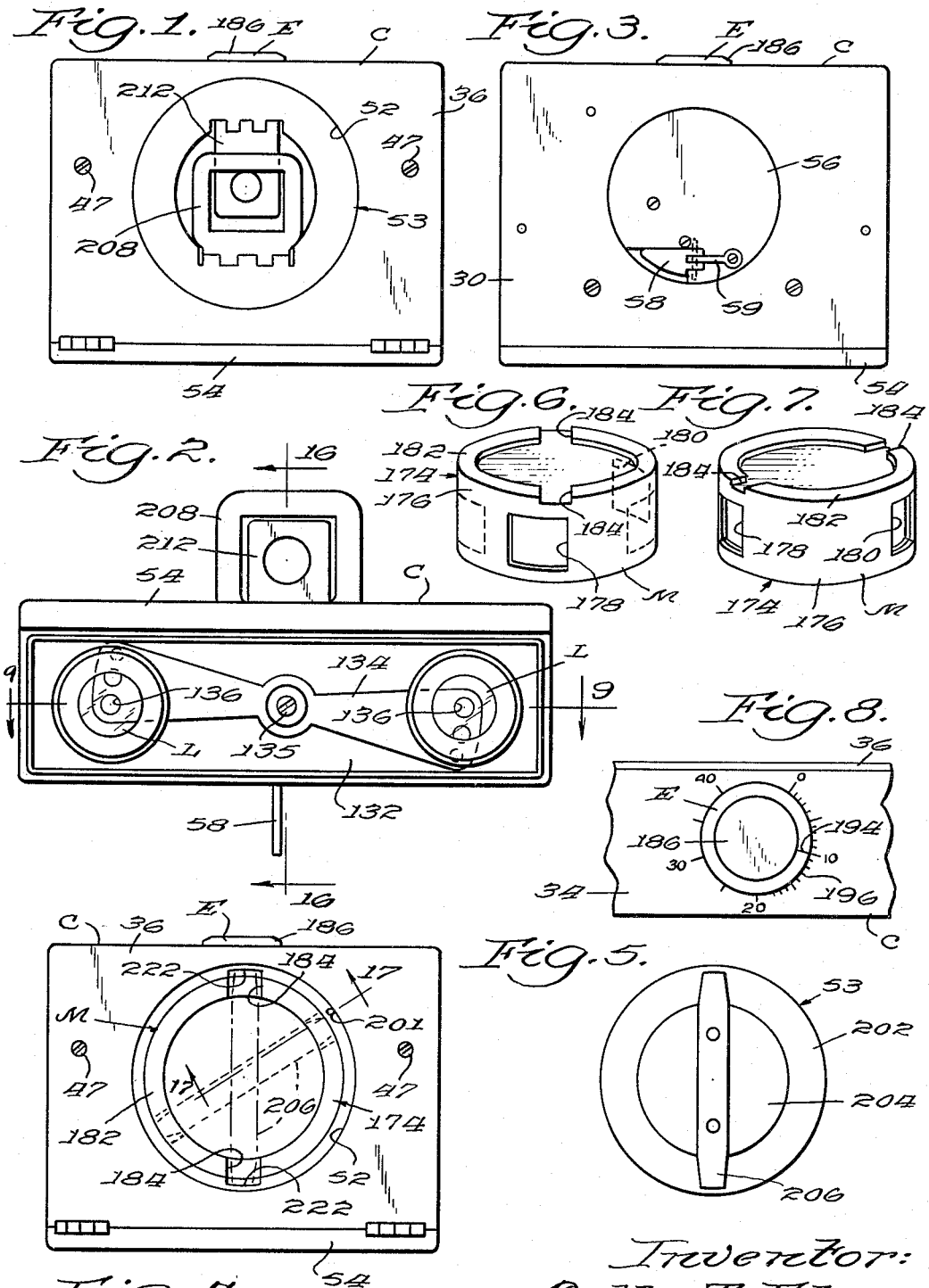

Nov. 15, 1955  R. T. FLORA  2,723,609
CAMERA APPARATUS FOR TAKING THREE-DIMENSIONAL STILL PICTURES
Filed Feb. 15, 1954  4 Sheets-Sheet 3
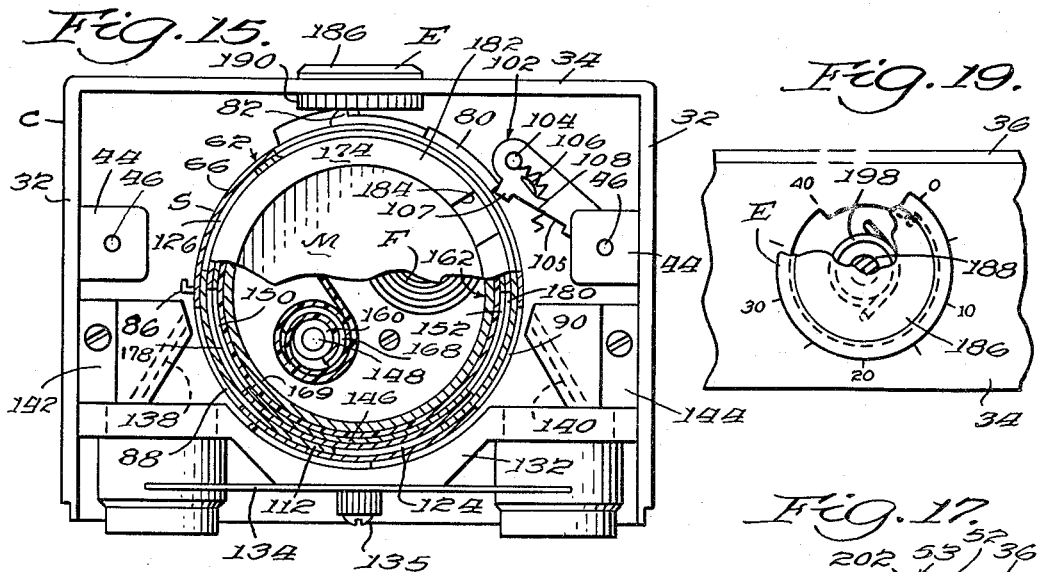
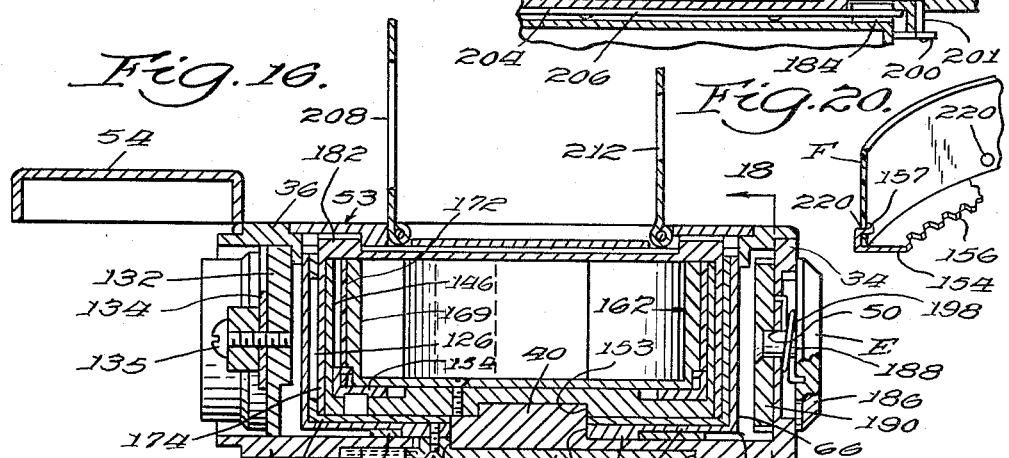
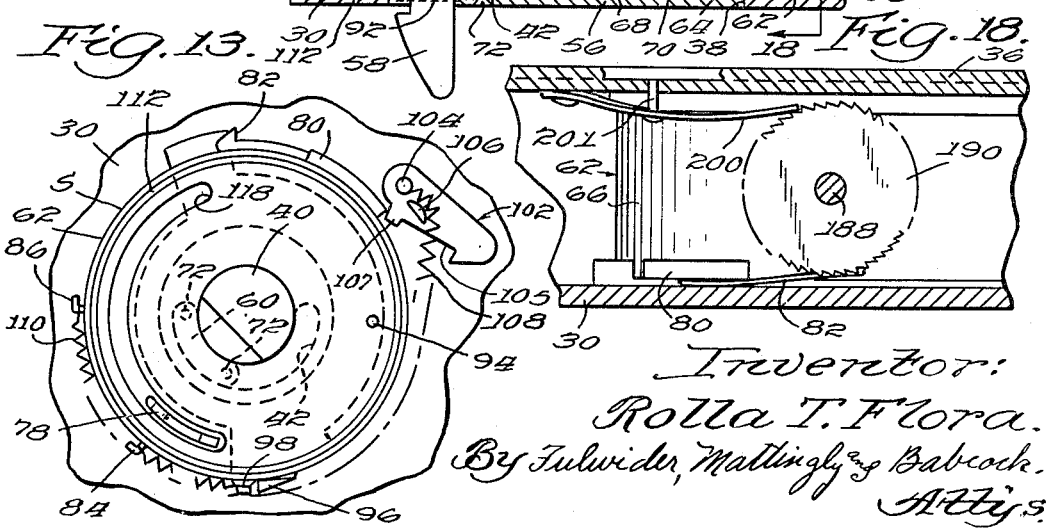
Inventor:
Rolla T. Flora.
By Fulwider, Mattingly & Babcock.
Attys.

Nov. 15, 1955 R. T. FLORA 2,723,609
CAMERA APPARATUS FOR TAKING THREE-DIMENSIONAL STILL PICTURES
Filed Feb. 15, 1954 4 Sheets-Sheet 4
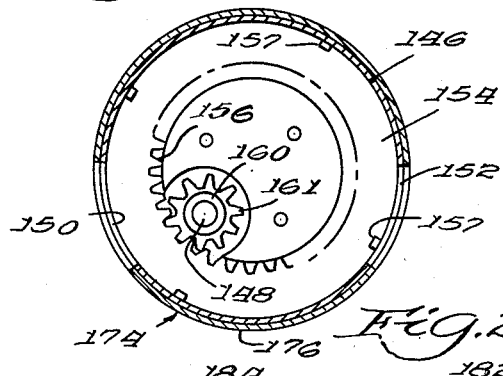
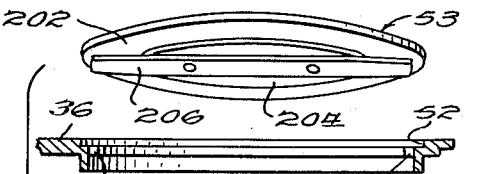
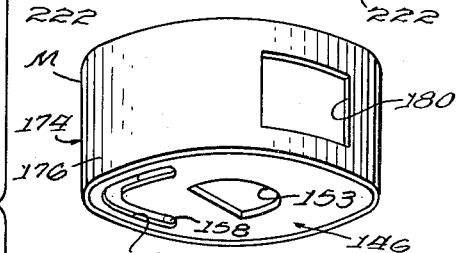
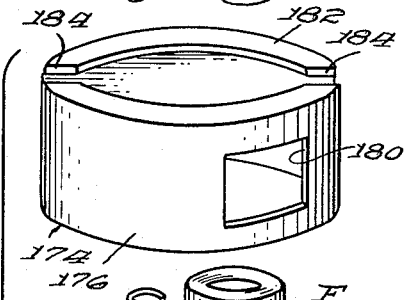
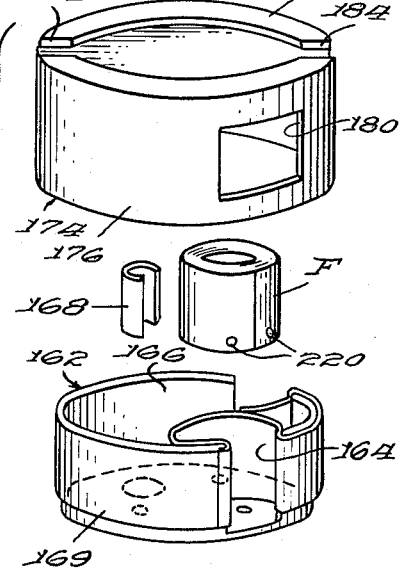
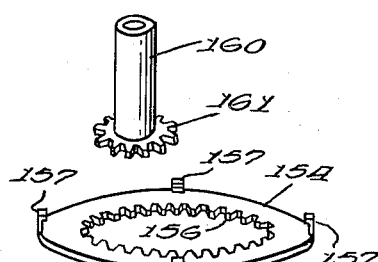
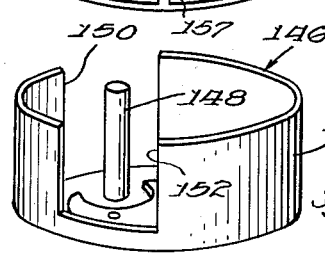
Inventor:
Rolla T. Flora.
By Fulwider, Mattingly & Babcock.
Att'ys.

United States Patent Office 2,723,609
Patented Nov. 15, 1955

2,723,609

CAMERA APPARATUS FOR TAKING THREE-DIMENSIONAL STILL PICTURES

Rolla T. Flora, Burbank, Calif.

Application February 15, 1954, Serial No. 410,141

6 Claims. (Cl. 95—18)

The present invention relates generally to the field of photography and more particularly to a novel camera especially adapted for taking a plurality of three-dimensional still pictures upon a roll of film.

Although there have been heretofore proposed several types of cameras capable of taking three-dimensional pictures, such cameras have not as yet met with wide spread acceptance. The cameras which are capable of providing satisfactory results generally prove to be too expensive for the average potential buyer, while those cameras selling at a comparatively moderate price do not provide satisfactory operation.

It is a major object of the present invention to provide a camera for taking three-dimensional still pictures which is very effective in operation and yet which may be sold at a comparatively moderate price.

Another object of the invention is to provide a camera for taking three-dimensional still pictures which is of compact size and which is light in weight.

A further object is to provide a camera of the aforedescribed nature which is foolproof in operation, whereby excellent pictures may be obtained by even an unskilled photographer.

Yet another object is to provide a camera of the aforedescribed nature having a simple and dependable means for varying the size of its lens aperture.

Still a further object of the invention is to provide a camera of the aforedescribed nature which is simple in design and rugged of construction whereby it may provide a long and useful service life.

An additional object is to provide a novel film magazine by means of which a roll of film may be loaded and unloaded with respect to the camera without requiring that such film be touched by the photographer.

Yet a further object is to provide a camera having a novel and automatically re-setting exposure counter.

These and other objects and advantages of the present invention will become apparent from the following detailed description of a preferred embodiment thereof, when taken in conjunction with the appended drawings therein.

Figure 1 is a top plan view of a preferred form of camera embodying the present invention;

Figure 2 is an enlarged front view of said camera;

Figure 3 is a bottom view of said camera;

Figure 4 is a top plan view similar to Figure 1, but with the camera's cover removed;

Figure 5 is a view showing the underside of the cover;

Figure 6 is a perspective view of a film magazine utilized with said camera;

Figure 7 is another perspective view of said magazine but showing its parts disposed in a different position;

Figure 8 is an enlarged side elevational view of an exposure counter utilized with said camera;

Figure 9 is an enlarged horizontal sectional view taken on line 9—9 of Figure 2;

Figures 10 through 13 are horizontal sectional views showing the operation of the shutter mechanism of said camera;

Figure 14 is an enlarged fragmentary vertical sectional view showing a detail of said camera;

Figure 15 is a top plan view of said camera with the top plate removed from its case;

Figure 16 is an enlarged vertical sectional view taken on line 16—16 of Figure 2;

Figure 17 is an enlarged vertical sectional view taken on line 17—17 of Figure 4;

Figure 18 is an enlarged vertical sectional view taken on line 18—18 of Figure 16;

Figure 19 is an enlarged view of the exposure counter shown in Figure 8, but partly broken away to show the inner parts thereof;

Figure 20 is a fragmentary perspective view of a detail of the film magazine;

Figure 21 is a horizontal sectional view taken through the film magazine;

Figure 22 is an exploded view showing the various parts of the shutter mechanism; and Figure 23 is an exploded view showing the various parts of the film magazine.

Referring to the drawings, the preferred form of camera embodying the present invention broadly comprises a hollow case C incorporating an optical system which includes a pair of lenses L and prisms 138 and 140 adapted to direct light upon a roll of film F. disposed within a magazine M, a shutter mechanism S is mounted within the case for controlling the passage of light from the lenses L onto the film F whereby a plurality of matched pairs of exposures may be taken along the length of the film. An exposure counter mechanism E is disposed at the rear of the case to provide an indication of the number of exposures taken.

I. THE CASE C

The case C of the camera is of generally rectangular configuration and includes a horizontal base wall 30, a pair of upstanding side walls 32, an upstanding rear wall 34 and a top wall 36. The base wall is centrally formed with an upwardly extending circular indentation 38, shown in Figure 16, a coaxial upstanding boss 40 extends upwardly from the indentation 38 within the confines of the case.

An arcuate slot 42 is formed forwardly of the boss 40. The relative positions between the indentation 38, boss 40 and slot 42 will be clear from Figures 13 and 16. The sidewalls of the case are rigidly secured to the sides of the base member 30. A pair of inwardly extending lugs 44 formed with threaded bores 46 are disposed at the intermediate portion of the top of each of these side walls for mounting the top wall 36 thereto by bolts 47. The rear wall 34 is secured to the rear end of the base member and to the sides of the rear of each of the side walls. The rear wall is centrally bored at 50 for mounting the counter mechanism E. The top wall 36 is centrally formed with a circular opening 52 that is normally covered by a cover member 53. The front end of the top wall pivotally mounts the upper end of a lens guard plate 54.

II. THE SHUTTER MECHANISM S

The shutter mechanism S includes a trigger disc 56 which is rotatably disposed within the indentation 38 of the base wall 30. This trigger disc 56 includes a tripping finger 58 that is pivotally secured at one of its ends to the main body of the disc. The free end of this tripping finger may be normally biased toward the trigger disc as by a spring 59. The trigger disc also includes an upwardly extending arcuate projection 60 which is slidably disposed within the arcuate slot 42 formed in the base wall 30.

An open topped cylindrical light blade 62 is rotatably journaled by the boss 40. This light blade has a bottom wall 64 and upstanding side walls 66. The bottom wall 64 is formed with a coaxial aperture 68 which slidably encompasses the boss 40. This wall is likewise formed with a depending collar element 70. The collar element 70 is rigidly secured to the projection 60 of the trigger disc 56 as by screws 72. With this arrangement, the trigger disc is rigidly affixed to the light blade whereby it may transfer rotation thereto. The bottom wall of the light blade is also formed with an arcuately extending slot 74 and with an opening 76 wherein is mounted an upwardly projecting spring finger 78. The exterior surfaces of the side walls 66 are formed at one side with a cam projection 80, from the rear of which extends a hook 82. On the opposite side of the light blade, the side walls are formed with spring mounting barbs 84 and 86. The side walls 66 are also formed with first and second rectangular light openings 88 and 90.

A ring-like pusher element 92 is interposed between the underside of the light blade 62 and the upper surface of the base wall 30. This pusher element 92 is journaled upon the collar 70 that depends from the bottom wall of the light blade whereby it may rotate freely relative to the light blade. The extent of such relative rotation is limited by the abutment of an upstanding pin 94 formed on the pusher element with either end of the arcuately extending slot 74 of the light blade. One side of the pusher element 92 is formed with a latch projection 96 adjacent to which is mounted a spring anchoring hook 98.

At one side of the light blade 62 a catch member 102 is pivotally mounted on the wall 30 by an upstanding pin 104. A pocket 105 is formed at one side of the catch member 102 for receiving the latch projection 96 of the pusher element 92. An upstanding lug 106 is integrally formed at the intermediate portion of the catch member, and a camming surface 107 is formed at the rear of the pocket 106. Tension springs 108 and 110 extend from the pin 104 to the barb 84 and between the spring hook 98 and the second barb 86, respectively, and the light blade 62.

An open topped cylindrical shutter blade 112 is concentrically disposed within the light blade 62. The bottom wall 114 of the shutter blade is formed with a coaxial aperture 116 that is journaled by the boss 40. This bottom wall is likewise formed with an arcuate slot 118 which receives a spring hook 78 of the light blade and with a small aperture 120 for receiving the pin 94 formed at the rear portion of the pusher element 92. Thus, it will be seen that the shutter blade and the pusher element are keyed against relative rotation. The side walls 122 of the shutter blade are formed with a pair of light openings 124 and 126 which are circumferentially spaced apart the same distance as the light openings 88 and 90 of the light blade 62.

III. THE OPTICAL SYSTEM

The optical system of the preferred form of camera includes a pair of suitable lenses L which are mounted on opposite sides of the front of the case by a vertical wall 132. Preferably, these lenses will be formed of glass, however, a suitable plastic may be employed in order to save cost. The aperture size of the lenses may be varied by means of a flat arm element 134 (Figure 2) which is pivotally mounted by a bolt 135 of the center portion of the wall 132. Referring to Figures 2 and 9, the outer ends of this arm element 134 are formed with a plurality of circular openings 136 of varying diameters. These openings are so spaced that a pair of equal sized openings may be simultaneously disposed upon the optical paths of the two lenses. These openings determine the aperture size of the lenses, and in order to effect a change in such aperture size, it is only necessary to pivot the arm element 134 through the necessary number of degrees to align the desired pairs of openings with the optical paths of the lenses. Thereafter, the arm element may be locked in place by tightening the bolt 135.

Light passing into the case C through the lenses L will be directed toward the light blade 62, the pair of prisms 138 and 140. These prisms will preferably take the form of mirrors which are rigidly mounted by a pair of support elements 142 and 144 behind the lenses, the latter being secured to the base wall 30 of the case. It should be particularly observed that light entering the housing through the lenses L tends to take a double optical path toward the light blade, that is, a direct path which bypasses the prisms 138 and 140, and an indirect path which includes the latter. In order to prevent light following a direct path from clouding the film, a pair of shields 145 are provided at the rear of the wall 132. These shields cover the inner portion of the lenses whereby all direct light will be blocked from the light openings of the shutter mechanism. This is a very important feature inasmuch as it permits very clear and sharp pictures to be obtained.

IV. THE FILM MAGAZINE M

The film magazine M is shown in detail in Figures 21 and 23. This magazine includes an open topped cylindrical body 146 that is somewhat smaller in diameter than the shutter blade 112. The bottom wall of the body 146 is formed with a rigid upstanding post 148 and with an arcuate slot 147. The side walls of this body are formed with a pair of circumferentially spaced rectangular light apertures 150 and 152. The bottom wall of the body is formed with a semicircular recess 153 adapted to be engaged by the upper portion of the boss 40 so as to lock the body against rotation relative to the case, as shown in Figure 22.

A film-advancing ring 154 is concentrically disposed within the lower portion of the body 146. The inner periphery of this ring is formed with teeth 156 while its outer periphery is formed with a plurality of circumferentially spaced hooks 157. Referring to Figure 14, the underside of the film-advancing ring 154 is formed with a plurality of upwardly extending notches 158. These notches are disposed upon the same radius as the arcuate slot 147 formed in the bottom wall of the magazine body (Figure 14) and the arcuate slot 118 formed in the bottom wall 114 of the shutter blade 112. The spring finger 78 of the light blades 62 extends upwardly through these two slots so as to be engageable with the notches 158. The purpose of such engagement will be fully set forth hereinafter. The film-advancing ring 154 is adapted to be rotated relative to the magazine body 146 by means of a gear element 160 which is journaled upon the post 148 and includes a lower portion formed with teeth 161 that are engaged with the teeth 156 of the ring.

A film guide 162 of open topped cylindrical configuration is fixedly mounted within the confines of the magazine body 146. This film guide includes a circular film holding compartment 164 adapted to initially contain the roll of film F and and a larger film-receiving section 166 into which the film is wound as a succession of pictures are taken thereon. The leading end of the film is adapted to be secured to the gear element 160 by means of a clip 168. Referring to Figure 9, it will be noted that side walls 169 and the film guide 162 are spaced radially inwardly adjoining side walls 170 of the body 146 whereby there is provided an annular film passage 172. The magazine body 146 is encompassed by a cylindrical cover 174. This cover 174 includes side walls 176 that are formed with rectangular light apertures 178 and 180. The cover is rotatable relative to the magazine body. The top of the cover is solid and it includes an upwardly extending ring 182 wherein are formed aligned slots 184 for a purpose to be described hereinafter.

V. THE EXPOSURE COUNTER MECHANISM E

Referring to Figures 8, and 15 through 20, the exposure counter mechanism E includes an indicating disc 186 which is keyed to pivot pin 188 having its front end rigidly secured to a toothed wheel 190. The pin 188 is rotatably disposed within the bore 50 formed at the midportion of the rear wall 34 of the case C.

The indicating disc 186 is marked with a line 194 that cooperates with numerical indicia 196 marked on the outer surface of the rear wall 34 to provide an indication of the number of exposures which have been taken at any time. A torsion spring 198 which encircles the pin 188 serves to constantly bias the indicating disc 186 in a counter-clockwise direction, as viewed in Figures 8 and 19, with the line 194 disposed adjacent the "0" of the numerical indicia 196. The indicating disc is caused to rotate in a clockwise direction through a desired number of degrees each time the shutter mechanism S is tripped by engagement of the hook 82 of the light blade 62 with the outer periphery of the toothed wheel 190. As shown in Figure 18, a flexible ratchet finger 200 is secured to the underside of the top wall 36 with its free end in constant engagement with the outer periphery of the toothed wheel 190. As a result of such engagement, retrograde movement of the toothed wheel in a counter-clockwise direction, as viewed in Figure 18, is prevented.

Referring to Figures 17 and 18, the intermediate portion of the ratchet finger 200 mounts an upstanding release pin 201. This pin 201 is constantly biased upwardly because of the configuration of the ratchet finger. The release pin, and hence the ratchet finger are normally maintained in their lowered position of Figures 17 and 18 by the abutment of the top of the pin with the underside of the cover member 53. When, however, the latter is removed from its opening 52, the free end of the ratchet finger will flex upwardly out of contact with the toothed wheel.

Referring to Figures 1, 4, 5, 16, and 22, the cover member 53 includes a circular base 202 adapted to be removably positioned within the circular opening 52 of the housing's top wall 36. This base 202 includes a center portion 204 which extends downwardly within the opening 52. A lock bar 206 is rigidly mounted by the underside of the center portion 204 with its ends extending radially outwardly thereof.

Conveniently, the cover member will incorporate a range finder having a framing element 208 pivotally secured to the front portion of the base 202, and a sighting element 212 that is pivotally secured to the rear portion thereof. The framing and sighting elements are adapted to be maintained in a downwardly pivoted position when the camera is not in use, as indicated in Figure 1.

VI. OPERATION

A. *Loading*

To operate the camera, a loaded magazine M is first placed within the case C. In a loaded magazine, the body of a roll of film F will be disposed within the confines of the film holding compartment 164 with the free end of the roll extending through the passage 172 into the film-receiving section 166, as shown in Figure 15. The clip 168 is utilized to secure the free end of the roll to the gear element 160. The lower portion of the film is formed with perforations 220 which are adapted to be successively engaged by the hooks 157 of the film-advancing ring 154, as indicated in Figure 20.

In order to place the magazine M into the case C, the cover member 53 is rotated in a counter-clockwise direction from its dotted line position of Figure 4 to its solid line position therein. In this manner, the ends of the lock bar 206 will become aligned with complementary slots 222 formed in the housing's top wall 36, and the cover member 53 may be lifted from the opening 52. A loaded magazine may then be inserted within the case with the generally semi-circular recess 153 of the magazine body 146 disposed upon the boss 40. In this manner, the magazine body will be restrained against rotation relative to the case.

When the magazine M is lowered into the case, the slots 184 of its cover 174 should be aligned with the slots 222 of the case. At this time, the apertures 178 and 180 of the cover 174 will not be aligned with the apertures 150 and 152 of the magazine body 146. Hence, no light can enter the magazine's interior initially. When the cover member 53 is again inserted within the top wall opening 52, the ends of its lock bar 206 will be disposed within the slots 184 of the magazine cover 174. As the cover member is rotated in a clockwise direction to its dotted line position of Figure 4, the magazine cover 174 will be rotated relative to the magazine body 146 so as to bring the latter's apertures 150 and 152 into alignment with apertures 178 and 180 of the cover. Light from the lenses L will then be free to pass through the shutter mechanism into the magazine. This operation is shown in Figures 6 and 7.

Before taking a picture, the lens guard plate 54 will be raised to its position of Figures 2 and 16. Additionally, the arm element 134 will be adjusted so as to provide the desired size of aperture for the lenses L.

B. *Shutter mechanism*

In order to trip the shutter mechanism, the tripping finger 58 will be utilized to initiate rotation of the trigger disc 56 relative to the case C. This rotation of the trigger disc effects concurrent rotation of the light blade 62 relative to the case. Referring to Figures 9 through 13, the light blade will initially be disposed in its position of Figure 9, the light openings 88 and 90 being out of alignment with the light openings 124 and 126 of the shutter blade 112.

As the light blade 62 commences clockwise rotation, the pusher element 92 will initially be restrained against concurrent clockwise rotation because its latch projection 96 is disposed within the pocket 106 of the catch member 102. The free end of the catch member 102 is retained in its position of Figure 9 by the tension of spring 104 against the lug 106, which tension increases as the clockwise rotation of the light blade continues, as indicated in Figure 10. When, however, clockwise movement of the light blade 62 has reached the stage shown in Figure 11, the cam projection 80 thereof will engage the camming surface 107 of the catch member 102 so as to move the latter to its dotted line position of this figure. The pusher element will then be free to rotate in a clockwise direction.

It should be noted that the pusher element 92 is rigidly coupled to the shutter blade 112 by means of its pin 94, the latter being disposed within the aperture 120 of the shutter blade. Accordingly, clockwise rotation of the shutter blade cannot take place until the pusher element is released for clockwise rotation. Once the pusher element is so released, both the pusher element and the shutter blade will be caused to rotate in a clockwise direction under the influence of the then stretched tension spring 110.

At the time the cam projection 80 of the light blade 62 engages the camming surface 107 of the catch member 102 the light openings 88 and 90 will be in alignment with the light apertures 150 and 152, and 178 and 180 of the magazine. When the shutter blade 112 is released for clockwise movement, it will rotate through a sufficient number of degrees that its light openings will become aligned with those of the light blade for the period of time required in order to produce a proper exposure of the film. Thereafter, the shutter blade will continue to move in a clockwise direction relative to the then stopped light blade until the tension spring 110 is no longer sufficiently stretched as to be able to overcome the tendency of the spring 108 to return the light blade to its original position. Both the light blade, and the shutter blade will then rotate in unison in a counterclockwise direction to their original positions. Inasmuch as this rotation occurs only while the light-receiving openings of the two blades are out of alignment, no light can pass into the magazine.

C. *Magazine*

It should be especially observed that the initial clockwise rotation of the light blade 62 effects concurrent movement of the roll of film F whereby an unexposed portion thereof will be urged adjacent each of the light apertures of the magazine. The film is caused to move by the clockwise rotation of the film-advancing ring 154 relative to the film guide 162, the latter being rigidly affixed to the magazine body 146. Referring to Figure 10, it will be seen that the spring finger 78 of the light blade 62 is initially disposed adjacent the catch member 102. As the light blade is rotated in a clockwise direction towards its film exposing position of Figure 13, the spring finger 78 also follows a clockwise path. This movement of the spring finger is transferred to the film-advancing ring 154 by its engagement with any one of the upwardly extending notches 158 formed on the underside of the ring. The spring finger travels within the arcuate slot 147 formed in the bottom wall of the magazine body. The spacing of these notches is so chosen that the film will be moved substantially the same distance each time the shutter mechanism is actuated.

D. *Exposure counter*

As noted previously hereinbefore, at the time the first exposure is to be taken, the line 194 of the indicating disc 186 is disposed adjacent the "0" of the numerical indicia 196. The line 194 will be caused to move clockwise (referring to Figure 8) to the first indicia mark after the "0" as the first exposure is taken. This is accomplished by the rotation of the toothed wheel 190 through a predetermined number of degrees. Rotation of the toothed wheel is in turn effected by the engagement of the hook 92 of the light blade 62 with its teeth.

This operation is clearly shown in Figures 13, 15, and 18, and with particular reference to the latter figure, it will be apparent that after such rotation of the toothed wheel, retrograde movement of the wheel under the influence of the torsion spring 198 will be effectively restrained by the ratchet finger 200.

After the total number of film exposures have been taken, the cover member 53 will be removed from the opening 52 whereby the magazine M may be recovered.

Referring to Figures 17 and 18, such removal of the cover member 53 will permit upward movement of the pin 101 and accordingly, the free end of the ratchet finger 200 may flex upwardly away from the toothed wheel 190. The latter is then free to return to its original position under the influence of the torsion spring 198, in which position the line 194 of the indicating disc will be positioned adjacent the "0" of the numerical indicia.

Although there has been shown and described what is presently considered to be the preferred embodiment of the invention, it will be apparent that various changes may be made without departing from the scope of the following claims.

I claim:

1. Camera apparatus for taking three-dimensional still pictures, comprising: a case; a pair of lenses mounted by said case; prism means for directing light from said lenses through said light apertures; a cylindrical film magazine disposed within said case and formed with a pair of light apertures; a shutter blade rotatably mounted within said case and encompassing said film magazine, the sidewalls of said blade being formed with a pair of light openings; a light blade rotatably mounted within said case and encompassing said shutter blade, the side walls of said blade being formed with a pair of light openings; a catch member pivotally mounted by said case and formed with a pocket; a latch projection on said shutter blade that is initially disposed within said pocket; a cam projection formed on said light blade at a point spaced circumferentially from said latch projection; spring means biasing said light blade towards its initial position; tension spring means interconnecting said light blade and said shutter blade, said tension spring means being stretched by rotation of said light blade from its initial position; and, means for rotating said light blade away from its initial position until said cam projection engages said catch member so as to effect release of said latch projection from said pocket.

2. Camera apparatus for taking three-dimensional still pictures, comprising: a case; a pair of lenses mounted by said case; a cylindrical film magazine disposed within said case and formed with a pair of light apertures; prism means for directing light from said lenses through said light apertures; a shutter blade rotatably mounted within said case and encompassing said film magazine, the side walls of said blade being formed with a pair of light openings; a light blade rotatably mounted within said case and encompassing said shutter blade, the side walls of said blade being formed with a pair of light openings; a catch member pivotally mounted by said case formed with a pocket at one of its sides and with a vertically extending lug; a catch projection fixedly secured relative to said shutter blade and initially disposed within said pocket; a cam projection formed on said light blade at a point spaced circumferentially from said latch projection; tension spring means connecting said catch member and the periphery of said light blade, said tension spring means abutting said lug so as to bias said catch member toward said light blade, said tension spring means also biasing said light blade towards its original position; second tension spring means interconnecting said light blade and said shutter blade, said second tension spring means being stretched by rotation of said light blade from its initial position; and means for rotating said light blade away from its initial position until said cam projection engages said catch member so as to effect release of said latch projection from said pocket.

3. Camera apparatus for taking three-dimensional still pictures, comprising: a case; a pair of lenses mounted by said case; a cylindrical film magazine disposed within said case and having side walls formed with a pair of light apertures; film-advancing means in said magazine adapted to move a film strip past said light apertures; a shutter blade rotatably mounted within said case and encompassing said film magazine, the side walls of said blade being formed with a pair of light openings; a light blade rotatably mounted within said case and encompassing said shutter blade, the side walls of said blade being formed with a pair of light openings; a catch member pivotally mounted by said case and formed with a pocket; a latch projection on said shutter blade that is initially disposed within said pocket; a cam projection formed on said light blade at a point spaced circumferentially from said latch projection; spring means biasing said light blade towards its initial position; tension spring means interconnecting said light blade and said shutter blade, said tension spring means being stretched by rotation of said light blade from its initial position; means for rotating said light blade away from its initial position until said cam projection engages said catch member so as to effect release of said latch projection from said pocket; and means operatively connecting said light blade with said film-advancing means whereby initial rotation thereof will effect movement of said film strip.

4. Camera apparatus for taking three-dimensional still pictures, comprising: a case; a pair of lenses mounted by said case; a cylindrical magazine disposed within said case and having side walls formed with a pair of light apertures; film-advancing means in said magazine adapted to move a film strip past said light apertures; a shutter blade rotatably mounted within said case and encompassing said film magazine, the side walls of said blade being formed with a pair of light openings; a light blade rotatably mounted within said case and encompassing said shutter blade, the side walls of said blade being formed with a pair of light openings; a catch member pivotally mounted by said case and formed with a pocket at one of its sides and with a vertically extending lug; a latch projection fixedly secured relative to said shutter blade and initially disposed within said pocket; a cam projection formed on said light blade at a point spaced circumferentially from said latch projection; tension spring means connecting said catch member and the periphery of said light blade, said tension spring means abutting said lug so as to bias said catch member toward said light blade, said tension spring means also biasing said light blade towards its original position; means for rotating said light blade away from its initial position until said cam projection engages said catch member so as to effect release of said latch projection from said pocket; and means operatively connecting said light blade with said film-advancing means whereby initial rotation thereof will effect movement of said film strip.

5. In a camera apparatus for taking three-dimensional still pictures and having a case, a pair of lenses mounted by said case, a cylindrical shutter mechanism that includes a pair of light openings which are momentarily uncovered so as to make an exposure, prism means interposed between said lenses and said shutter mechanism, and a trigger member, a film magazine which comprises: a cylindrical body adapted to be concentrically disposed within said shutter mechanism and which is locked to said case; a pair of light apertures formed in the side walls of said body; film guide means positioned within said body for supporting a film strip; a post mounted by said body; a gear element rotatably carried upon said post and adapted to be secured to one end of said film strip; a film-advancing ring concentrically disposed in said body for rotation relative thereto, said ring being formed with teeth having engagement with said gear element; means on said ring engageable with said film strip for effecting movement thereof past said apertures; and, means operatively connecting said ring to said shutter mechanism whereby operation thereof will effect movement of said film strip.

6. In a camera apparatus for taking three-dimensional still pictures and having a case, a pair of lenses mounted by said case, a cylindrical shutter mechanism that includes a pair of light openings which are momentarily uncovered so as to make an exposure, prism means interposed between said lenses and said shutter mechanism, and a trigger member, a film magazine which comprises: a cylindrical body adapted to be concentrically disposed within said shutter mechanism and which is locked to said case; a pair of light apertures formed in the side walls of said body; a film guide disposed within said body and defining a film holding compartment for initially containing a roll of film having longitudinally spaced perforations, and a film-receiving section into which said film is adapted to be wound as exposures are made thereon, a passage being defined between said compartment and said section; a post mounted by said body and extending into said film-receiving section; a gear element rotatably carried upon said post and adapted to be secured to the leading end of said film roll; a film-advancing ring concentrically disposed in said body for rotation relative thereto, said ring being formed with teeth having engagement with said gear element; a plurality of circumferentially-spaced hooks on the outer periphery of said ring, said hooks being engageable with the perforations of said film so as to pull the latter through said passage; and, means operatively connecting said ring to said shutter mechanism whereby operation thereof will effect movement of said film strip.

References Cited in the file of this patent

UNITED STATES PATENTS

| | | |
|---|---|---|
| 1,905,956 | Watson | Apr. 25, 1933 |
| 1,955,300 | Kurnick | Apr. 17, 1934 |
| 1,957,043 | Harlow | May 1, 1934 |
| 2,531,652 | Tait | Nov. 28, 1950 |
| 2,563,811 | Barnes | Aug. 14, 1951 |
| 2,625,087 | Steineck | May 13, 1953 |